US006406074B1

United States Patent
Mahaney

(12) United States Patent
(10) Patent No.: US 6,406,074 B1
(45) Date of Patent: Jun. 18, 2002

(54) DESTRUCTIBLE LOCKING DEVICE

(75) Inventor: John Mahaney, Spencer, MA (US)

(73) Assignee: Inner-Tite Corp., Holden, MA (US)

( * ) Notice: Subject to any disclaimer, the term of this patent is extended or adjusted under 35 U.S.C. 154(b) by 0 days.

(21) Appl. No.: 09/437,855

(22) Filed: Nov. 10, 1999

(51) Int. Cl.[7] ............................................. E05B 39/02
(52) U.S. Cl. ..................... 292/327; 411/54.1; 411/3; 411/4; 411/5; 292/256.67; 292/256.6
(58) Field of Search ................... 292/327, 346, 292/256.6, 256.67; 70/34, 422, 50; 411/3, 4, 5; 403/2, 19

(56) References Cited

U.S. PATENT DOCUMENTS

| | | | |
|---|---|---|---|
| 3,861,180 A | 1/1975 | Heckrotte, Sr. et al. | |
| 3,867,822 A | 2/1975 | Morse et al. | |
| 4,008,585 A * | 2/1977 | Lundberg | 70/164 |
| 4,037,515 A | 7/1977 | Kesselman | |
| 4,076,291 A | 2/1978 | Pope et al. | |
| 4,225,165 A | 9/1980 | Kesselman | |
| 4,331,012 A | 5/1982 | Swisher | |
| 4,414,829 A * | 11/1983 | Nielson, Jr. et al. | 70/160 |
| 4,415,190 A | 11/1983 | Finck, Jr. et al. | |
| 4,420,864 A | 12/1983 | Hoyt | |
| 4,493,230 A | 1/1985 | Hughes | |
| 4,989,770 A | 2/1991 | Soto | |
| 5,005,883 A * | 4/1991 | Guiler | 292/327 |
| 5,127,687 A * | 7/1992 | Guiler | 292/327 |
| 5,161,838 A | 11/1992 | Ely et al. | |
| 5,213,460 A * | 5/1993 | Sadri et al. | 411/43 |
| 5,542,273 A * | 8/1996 | Bednarz | 70/34 |
| 5,542,722 A * | 8/1996 | DeWalch | 292/256.6 |
| 5,651,649 A * | 7/1997 | Sadri et al. | 411/34 |
| 5,749,610 A * | 5/1998 | Brammall et al. | 292/327 |
| 5,775,747 A * | 7/1998 | Navarsky | 292/307 |
| 5,870,911 A | 2/1999 | DeWalch | |
| 6,032,989 A * | 3/2000 | DeWalch et al. | 292/256.6 |
| 6,036,418 A * | 3/2000 | Stencel et al. | 411/54.1 |
| 6,039,365 A * | 3/2000 | Rogatnev | 292/327 |
| 6,183,370 B1 * | 2/2001 | Lim | 464/162 |
| 6,247,883 B1 * | 6/2001 | Monserratt | 411/34 |

* cited by examiner

Primary Examiner—Anthony Knight
Assistant Examiner—Matthew E. Rodgers
(74) Attorney, Agent, or Firm—Samuels, Gauthier & Stevens

(57) ABSTRACT

A locking device is disclosed for interlocking two members having aligned openings extending therethrough. The device includes a hollow cap and a pin with an enlarged head at one end and a nose at the opposite end. The pin is insertable through the aligned openings of the members, with its nose received in interlocked engagement within the cap, and with the two members captured between the cap and the enlarged head of the pin. A frangible portion of the pin is severable in response to relative rotation between its nose and enlarged head to thereby destructively disassemble the locking device.

13 Claims, 8 Drawing Sheets

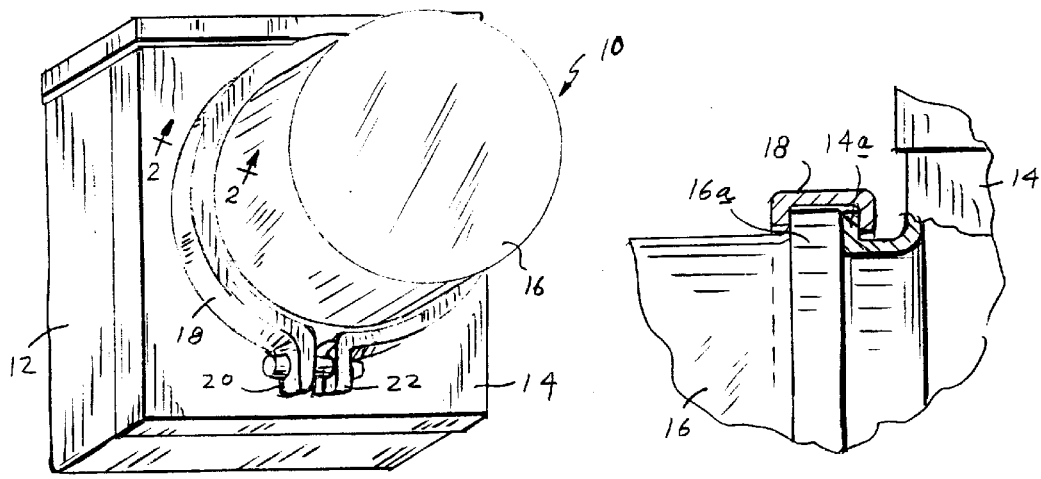
FIG. 1
FIG. 2
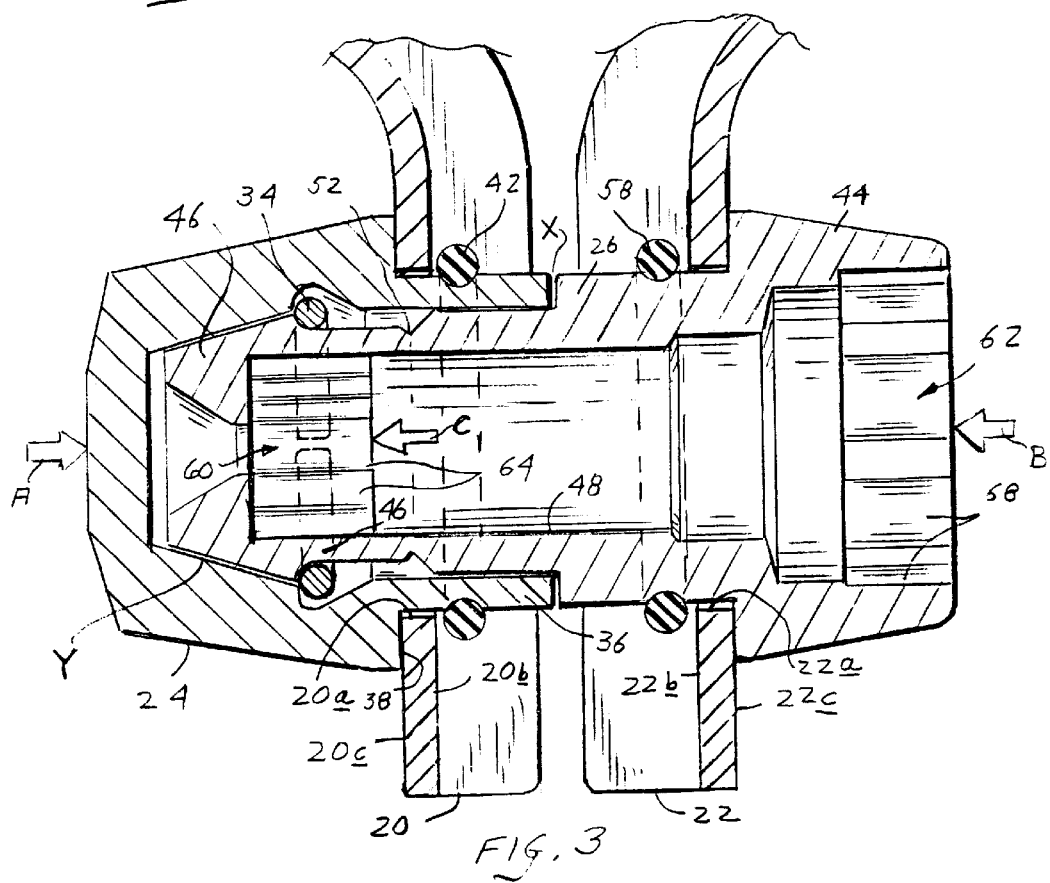
FIG. 3

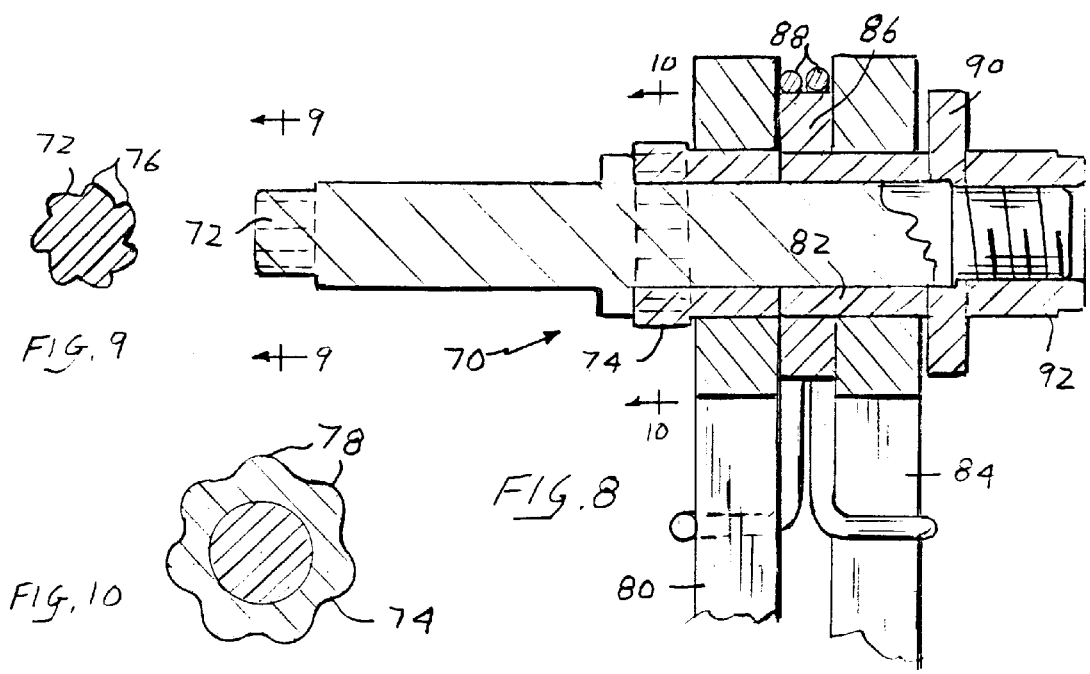
FIG. 9
FIG. 10
FIG. 8
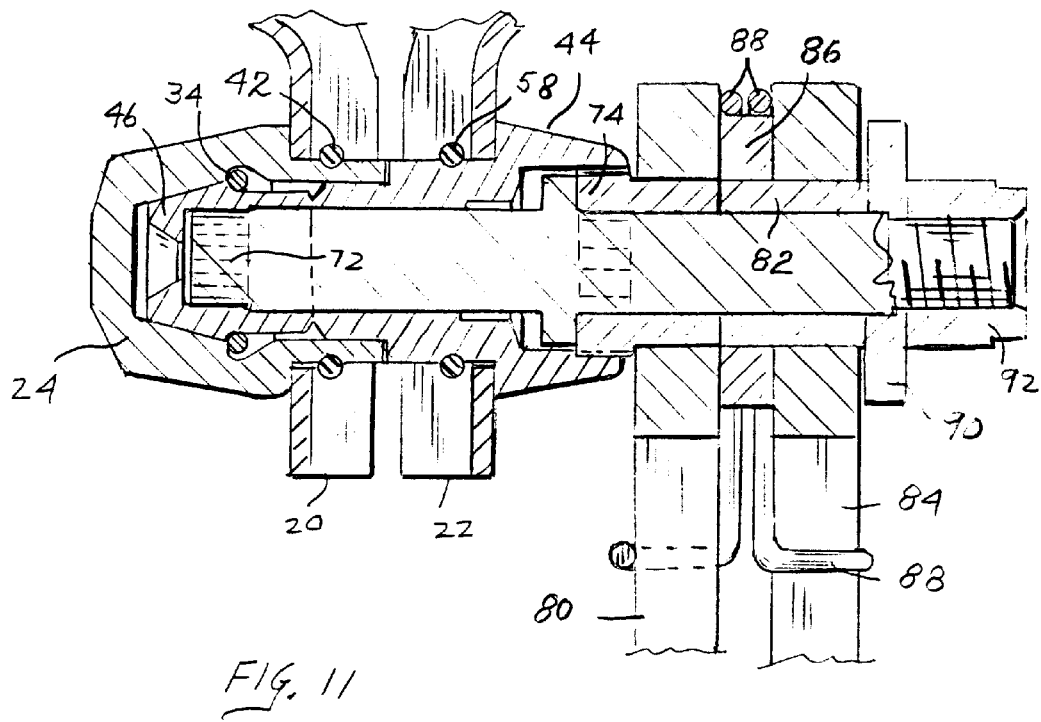
FIG. 11

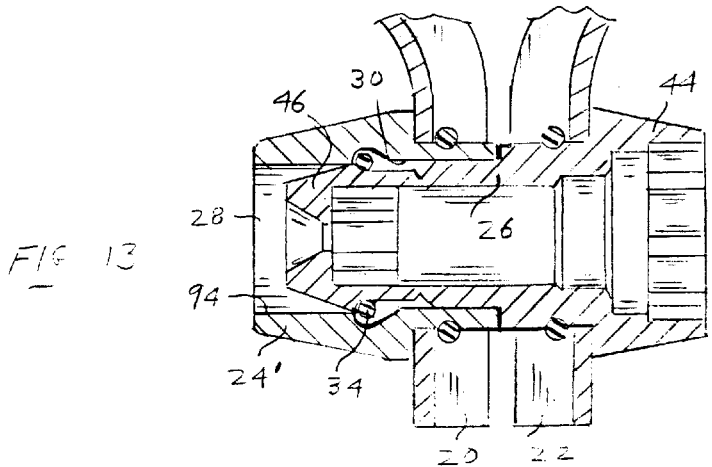
FIG. 13
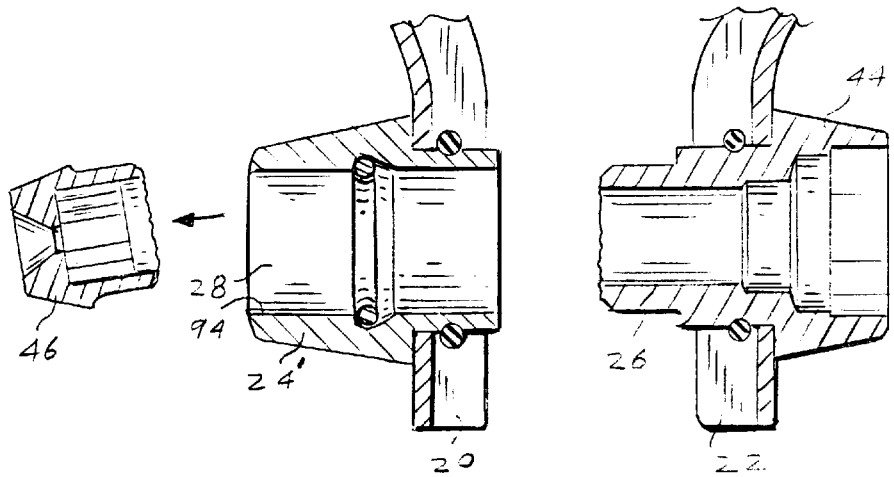
FIG. 14
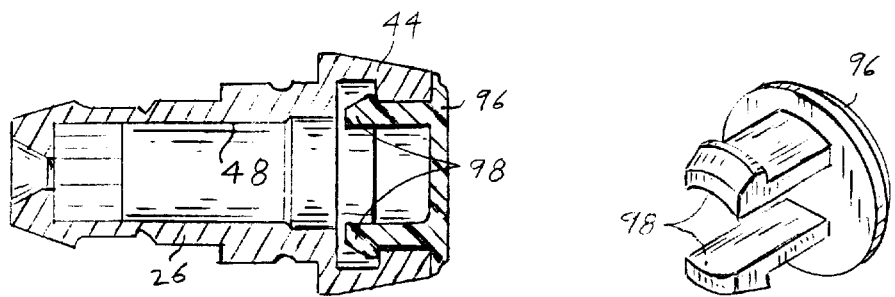
FIG. 15
FIG. 16

DESTRUCTIBLE LOCKING DEVICE

BACKGROUND

1. Field of the Invention

This invention relates to destructible locking devices of the type employed to releasably interconnect mating components of security devices. Such security devices are widely employed by public utilities to secure meters, supply valves, etc. against unauthorized access.

2. Description of the Prior Art

The operating mechanism of a conventional utility meter is typically enclosed within a transparent dome which in turn is removably attached to the cover of a box-shaped housing. The cover and dome have circular rims that are held in an axially aligned abutting relationship by a channel-shaped split retaining ring. The ends of the retaining ring are configured as mating components which are releasably interconnected in a confronting relationship by locks of varying design.

One such lock of the destructible type is disclosed in U.S. Pat. No. 5,161,838 (Ely et al.), where the mating end components of the split retaining ring are captured between an enlarged head at one end of a stud, and a cap-shaped housing secured to the opposite end of the stud. The stud is further provided with a frangible section adjacent its head which is designed to shear under a compressive load. The load is axially applied by a tool engaging both the cap shaped housing and the head of the stud.

One drawback with this type of lock is that it may be destructively disassembled by any tool capable of exerting the required compressive force. Thus, where multiple utility systems employ locks of this type, one systems' tools can be used to compromise the security of the other systems' meters.

A lock of this type also requires a relatively high level of compressive force to shear the frangible stud section. This in turn requires utility personnel to carry tools that are heavy, cumbersome, and have unduly long operating cycles, typically involving the use of wrenches or the like to operate screw actuated force exerting mechanisms.

A general objective of the present invention is the provision of an improved destructible locking device which either obviates or at least significantly minimizes the above described drawbacks of the prior art.

A specific objective of the present invention is the provision of a locking device which is uniquely configured to be destructively disassembled only by a tool having a mating uniquely configured design.

A companion objective of the present invention is the provision of a locking device which may be destructively disassembled by the application of only a relatively modest torque.

SUMMARY OF THE INVENTION

The locking device of the present invention is useful, for example, in releasably interlocking two confronting components having aligned openings, typically the ends of a split ring used to secure the transparent dome of a utility meter to the cover of a meter box. In one embodiment to be described hereinafter in greater detail, the locking device includes a hollow cap and a pin having an enlarged head at one end and a nose at its opposite end. The pin is configured and dimensioned to extend through the aligned openings of the confronting components, with its nose received in permanent interlocked engagement in the cap, thereby securely capturing the confronting components between the cap and the enlarged head of the pin. The nose has a frangible portion which may be severed by twisting the nose relative to the pin head. The locking device may be destructibly disassembled by subjecting the pin to a torque sufficient to shear the frangible nose portion. A specially configured tool is engageable with mating specially configured pin segments to effect the required torque application.

BRIEF DESCRIPTION OF THE DRAWINGS

Preferred embodiments of a locking device and tool in accordance with the present invention will now be described in detail with reference to the accompanying drawings, wherein:

FIG. 1 is a perspective view of a typical utility meter having a transparent dome removably attached to the meter box cover by a split retaining ring, with the ends of the retaining ring being secured by a locking device in accordance with the present invention;

FIG. 2 is a sectional view on an enlarged scale taken along line 2—2 of FIG. 1;

FIG. 3 is an enlarged longitudinal sectional view through the locking device of the present invention, showing the locking device in its locked condition;

FIG. 8 is a sectional view on an enlarged scale taken along line 8—8 of FIG. 7;

FIGS. 9 and 10 are cross sectional views taken along line 9—9 and 10—10 of FIG. 8;

FIG. 11 is a view similar to FIG. 3 showing the tool operatively positioned to destructively disassemble the locking device;

FIG. 13 is a longitudinal sectional view of an alternative embodiment of a locking device in accordance with the present invention;

FIG. 14 is a view similar to FIG. 13 showing the locking device after it has been destructively disassembled;

FIG. 15 is a cross sectional view showing a seal closing the end of the passageway in the locking pin;

FIG. 16 is a perspective view of the seal shown in FIG. 15;

DESCRIPTION OF PREFERRED EMBODIMENTS

Figure 4:
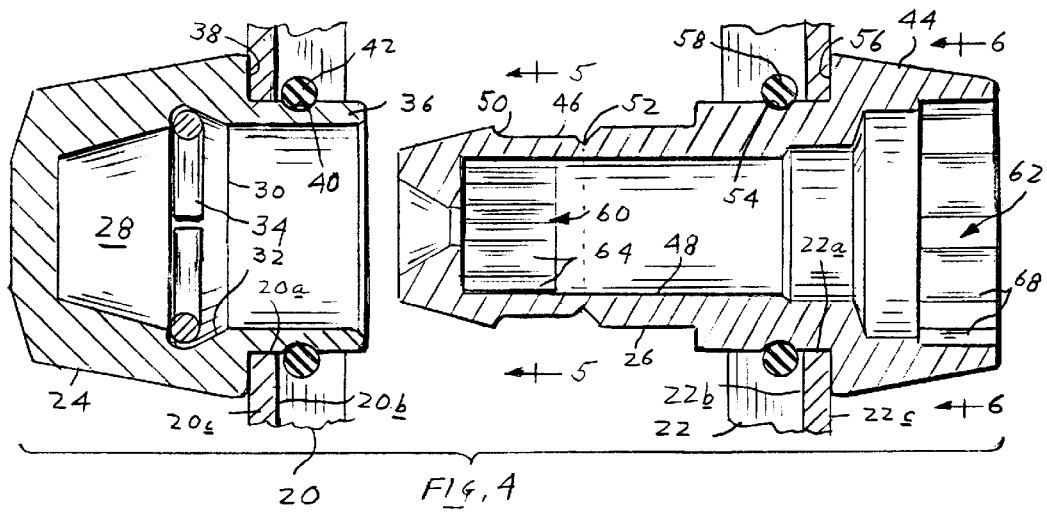
FIG. 4 is a longitudinal sectional view of the locking device prior to its assembly into the locked condition shown in FIG. 3.

With reference initially to FIGS. 1 and 2, a conventional utility meter is shown at 10 comprising a meter box 12 closed by a cover 14 which supports a transparent dome 16 enclosing the meter mechanism (not shown). The cover 14 and dome 16 have circular flanges 14a, 16a which are secured in a confronting abutting relationship by a channel shaped split retaining ring 18 The ends of the ring are bent outwardly to provide first and second mating components 20, 22.

As can best be seen by further reference to FIG. 3, the mating components 20, 22 are provided respectively with first and second openings 20a, 22a extending between inner and outer surfaces 20b, 20c and 22b, 22c.

One embodiment of a locking device in accordance with the present invention comprises a receiving element in the form of a hollow cap 24 and a pin 26. With additional reference to FIGS. 4–6, it will be seen that the cap 24 has an interior chamber 28 accessible via an open mouth 30. An interior groove 32 contains a resilient snap ring 34. A cylindrical sleeve 36 communicates with the mouth 30 and protrudes axially from an external shoulder 38. The sleeve 36 is externally provided with a groove 40 which coacts with an optional resilient O-ring 42 to detachably retain the cap in its assembled position on the mating ring component 20 as shown in FIG. 4, with the sleeve 36 protruding through the opening 20a, and with the shoulder 38 bearing against the outer surface 20c.

The pin 26 has an enlarged head 44 at one end and a nose 46 at its opposite end. A passageway 48 extends axially through the pin. The pin is externally configured to provide a shoulder 50 axially outboard of a V-shaped groove 52, and a circular groove 54 inboard of a shoulder 56. The groove 52 provides a demarcation line between the nose 46 and the remainder of the pin, and has a depth sufficient to define a frangible portion of the pin. The groove 54 coacts with an optional second resilient O-ring 58 to detachably retain the pin 26 in its assembled position extending through the opening 22a in ring component 22, with the shoulder 56 abutting against the outer surface 22c.

Figure 5:
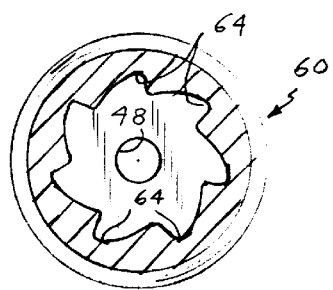
FIGS. 5 and 6 are cross sectional views taken respectively along lines 5—5 and 6—6 of FIG. 4.
Figure 6:
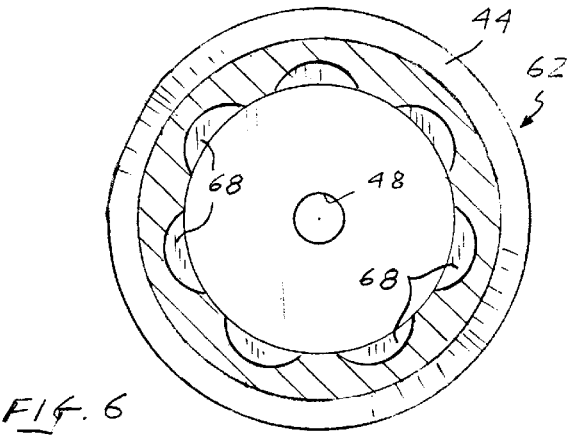

The pin is internally configured to provide axially separated torque receiving sections 60, 62 located respectively in the nose 46 and head 44. As shown in FIG. 5, the torque receiving section 60 has specially configured flutes indicated typically at 64. As shown in FIG. 6, the torque receiving section 62 has differently configured flutes indicated typically at 68.

In its initial unlocked state, as shown in FIG. 4, the cap 24 and pin 26 of the locking device are axially separated and detachably retained, respectively on the ring components 20, 22 by the optional O-rings 42, 58. The lock is assembled by simply pressing the pin and cap together, thereby causing the nose 46 to enter the cavity 28 via the sleeve 36 and mouth 30, where the shoulder 50 is engaged by the snap ring 34 in a snap connection, thereby permanently securing the cap 24 to the nose 46, as shown in FIG. 3.

Referring now to FIGS. 7–10, a tool 70 is provided for destructively disassembling the locking device. The tool includes first and second relatively rotatable dies 72, 74. As shown in FIG. 9, the first die 72 is externally configured with ridges 76 specially configured to coact in mating interengagement with the internal flutes 64 in the nose 46 of the lock pin 26. Similarly, as shown in FIG. 10, the second die 74 is externally configured with ridges 78 specially configured to coact in mating interengagement with the internal flutes 68 in the head 44 of the lock pin 26.

The second die 74 is pinned or otherwise fixed to an outer handle 80, and the first die 72 is similarly secured to a bushing 82 fixed with respect to an inner handle 84.

Figure 7:
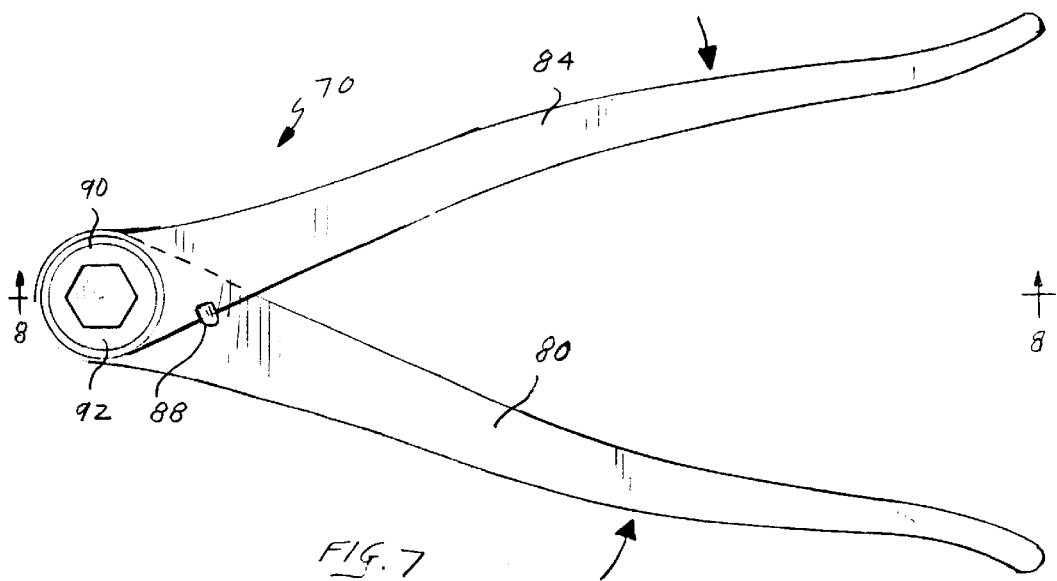
FIG. 7 is a plan view of a tool used to destructively disassemble the locking device.

The handles 80, 84 are separated by a washer 86 and are resiliently retained in the open position shown in FIG. 7 by a spring 88. An external washer 90 and lock nut 92 completes the assembly.

In order to destructively disassemble the locking device, the tool 70 is operatively positioned as shown in FIG. 11, with the ridges 76 of the first die 72 mechanically interengaged with the flutes 64 of the torque receiving section 60 in the nose 46, and with the ridges 78 of the second die 74 mechanically interengaged with the flutes 68 of the torque receiving section 62 in the head 44. The handles 80, 84 are then closed in the direction of the arrows in FIG. 7, thereby contrarotating the first and second dies 72, 74. A corresponding rotation is thus imparted to the nose 46 and head 44, causing the pin to torsionally shear at the groove 52.

Figure 12:
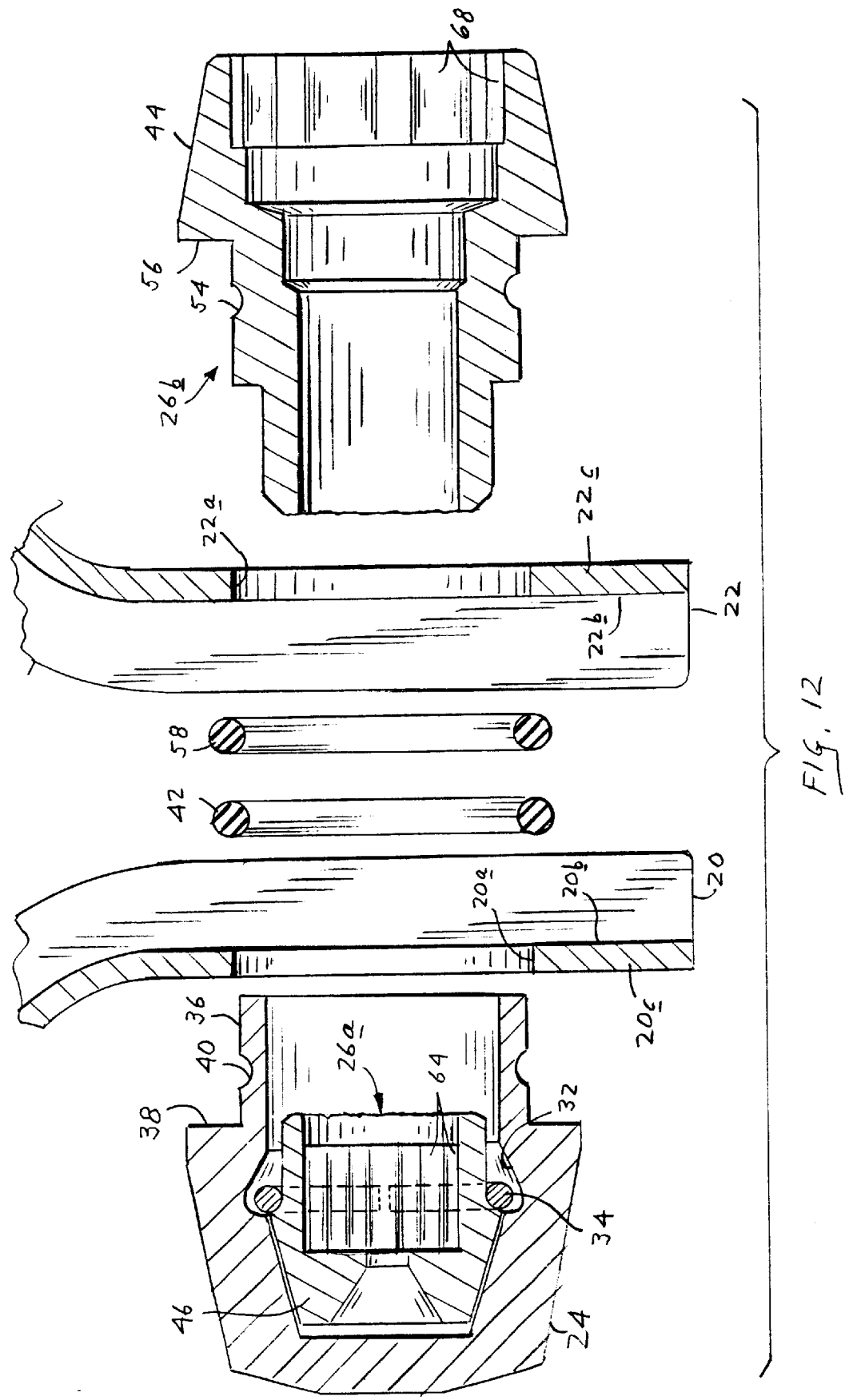
FIG. 12 is an exploded view showing the locking device in its destructively disassembled state.

As shown in FIG. 12, this results in the pin being broken apart into two segments 26a, 26b. Segment 26a remains captured within the cap 24, the latter being disengageable from ring component 20 by simply overcoming the yieldable retaining force exerted by O-ring 42. Pin section 26b is similarly disengageable from ring component 22.

With references to FIGS. 13 and 14, it will be seen that a modified cap 24' may be provided with a second opening 94 which preferably is in alignment with the mouth 30 through which the nose 46 is received in the chamber 28. When the locking device is destructively disassembled as previously described, the nose 46 can be ejected from the cap chamber 28 via opening 94 as shown in FIG. 14. Thus, the cap 24' can be preserved for reuse with another locking pin after the fractured pin segment has been disengaged from the ring component 22 and replaced by a fresh pin.

In order to further enhance security, a tamper evident seal may be applied to the locking device. For example, as shown in FIGS. 15 and 16, the seal may comprise a plastic disk 96 applied to the head 44 of the pin 26 at a position closing off the open end of passageway 48. The disk may be held in place by integral resilient legs 98 configured and arranged to mechanically engage interior surfaces of the head 44. In order to gain access to the passageway 48, the disk must be broken and removed, thus providing visual evidence that an attempt has been made to compromise the integrity of the locking device.

Figure 17:
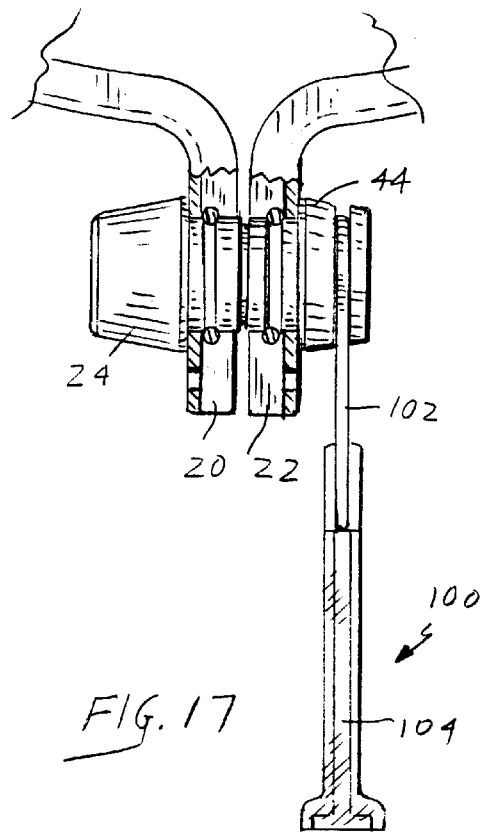
FIG. 17 is an illustration of a alternative seal useful with the locking device of the present invention.
Figure 18:
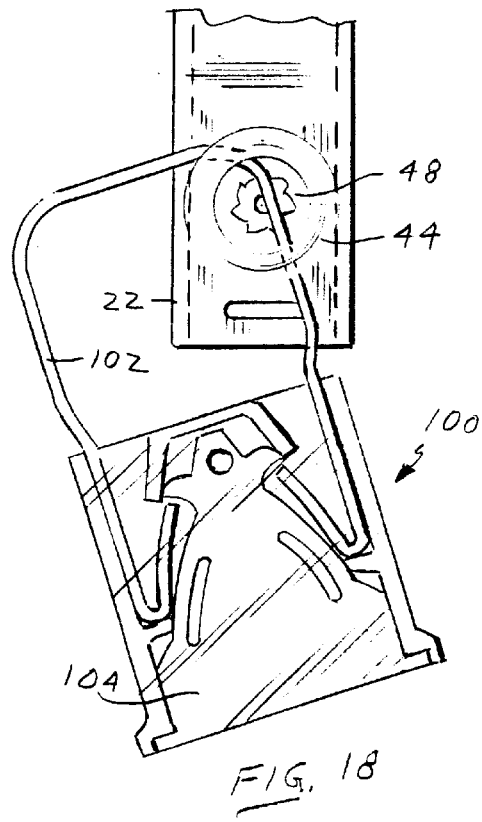
FIG. 18 is an end view of the seal shown in FIG. 17.

In the embodiment shown in FIGS. 17 and 18, an alternative embodiment of a seal 100 includes a wire 102 threaded through holes in the pin head 44 to extend across the entry end of the passageway 48. The ends of the wire are permanently captured in a transparent plastic housing 104 of generally known design. Here again, in order to gain access to the passageway, the wire 102 must be cut or the plastic housing must be destroyed in order to remove the seal 100 from the locking device, thereby providing visual evidence of attempted tampering.

Figure 19:
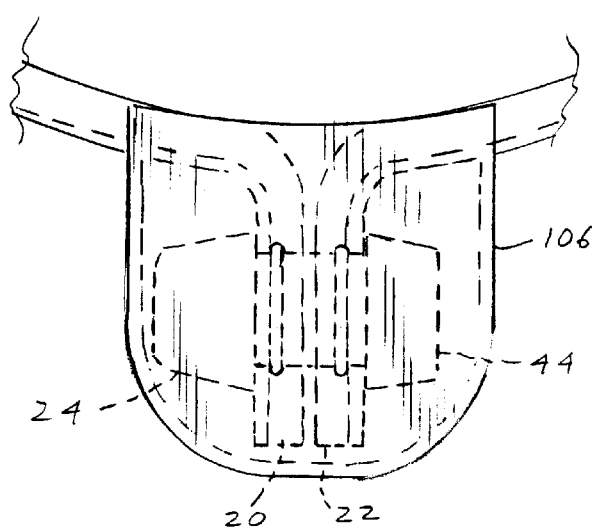
FIG. 19 is a view showing the locking device of the present invention enclosed within a protective plastic cap.
Figure 20:
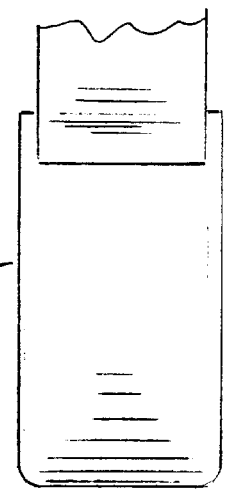
FIG. 20 is a side view of the assembly shown in FIG. 19.

As shown in FIGS. 19 and 20, under certain circumstances it may be desirable to completely enclose the locking device. To this end, a suitably configured plastic cap 106 may be inserted over the locking device and mating ring components.

The locking device of the present invention is useful with security devices other than split retaining rings used to detachably couple meter domes to the covers of meter boxes. For example, FIGS. 21A and 21B illustrate a security device 106 of the type employed to retain the cover 108 of a meter box in a closed position with respect to the box sidewall 110.

The security device includes a housing 112 secured to the exterior of the box wall 110 by means of an internally accessible bolt 114 which extends through a reinforcing element 116 and through a hole in the box wall. The bolt is threaded into the base of the housing as at 118.

Figures 21A, 21B:
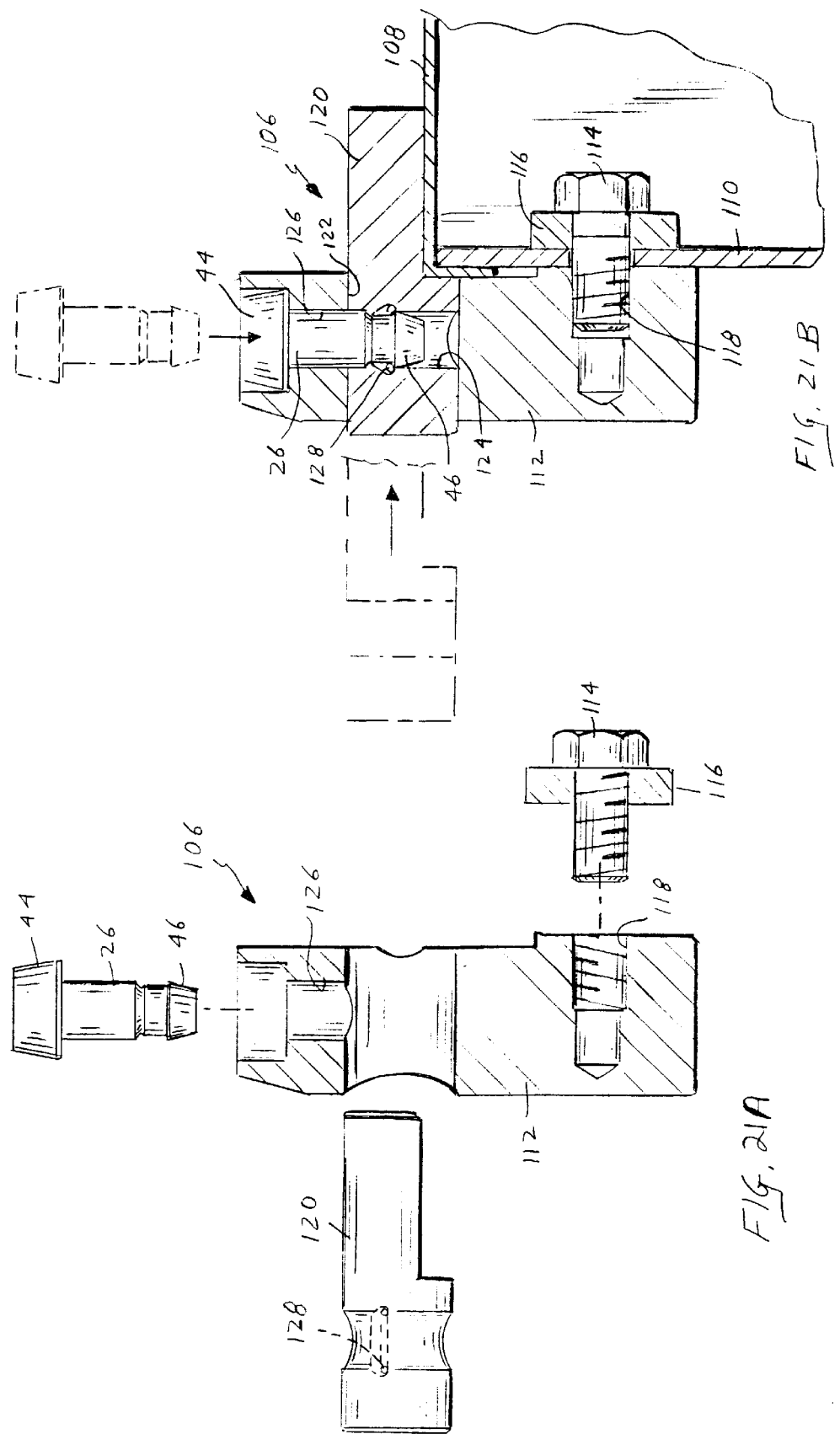
FIG. 21a is an exploded view of an alternative embodiment of a locking device in accordance with the present invention.
FIG. 21b shows the components of FIG. 21a in their assembled state.

A receiving element 120 in the form of a deadbolt is shiftable in a transverse passageway 122 in the housing 112 between an operative position overlapping the box cover 108, as shown in FIG. 21B, and a retracted position as shown in FIG. 21A, and as indicated by the broken lines in FIG. 21B. The deadbolt has a vertical passageway 124 which communicates with a vertical passageway 126 in the housing 112. The deadbolt passageway 124 defines a chamber which is internally grooved to accept a resilient snap ring 128. When the deadbolt is in its operative position with the passageways 124, 126 in mutual alignment, a lock pin of the type described previously may be inserted as shown, with the nose 46 of the lock pin captured in the deadbolt passageway 124 by the snap ring 128. The deadbolt may then be retracted only by first destructively separating the nose 46 from the remainder of the pin, as described previously.

Figures 22A, 22B:
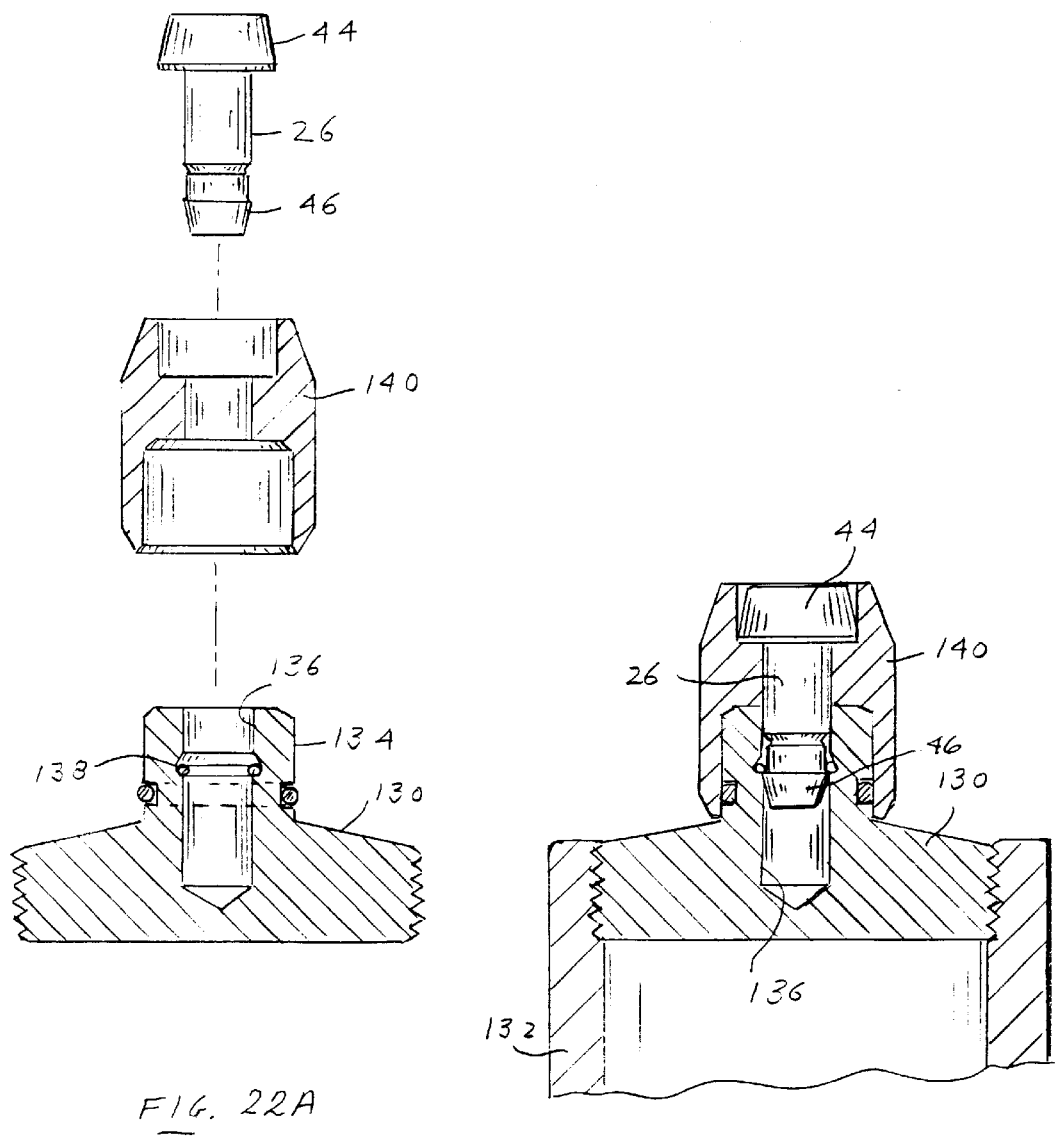
FIG. 22a is an exploded view still another embodiment of a locking device in accordance with the present invention.
FIG. 22b is a view of the components shown in FIG. 22a in their assembled state.

In FIGS. 22A, 22B, a receiving element in the form of a gas plug 130 is shown threaded into the end of a supply pipe 132. The plug has the usual multi faced neck 134 which is configured to be engaged and rotated by a wrench (not shown). The plug includes a blind bore 136 forming a chamber which is internally grooved to accept the snap ring 138. A protective cap 140 is seated over the neck 134 and is rotatable with respect to the neck to thereby foil an attempt to rotate the plug by means of a wrench or other like tool. The cap is held in place by a lock pin as described previously, the nose 46 of which is again captured in the passageway 124 by the snap ring 138. In order to remove the cap 140, one must destructively separate the nose 46 from the remainder of the pin 26, again as previously described.

In light of the foregoing, it will now be appreciated by those skilled in the art that the present invention offers significant advantages not available with prior art locking devices. Most importantly, by providing the pin 26 with torque receiving sections 60, 62 which are specially configured to coact with mating specially configured dies 72, 74 on the tool 70, security is markedly enhanced by virtue of the fact that the locking device can only be destructively disassembled by a tool specially designed for that purpose. By varying the shapes and or orientations of the flutes of one or both of the torque receiving sections 60, 62, a myriad of combinations can be developed, each being accessible only by tools specifically designed to do so. Other tools designed to work with other locks cannot be used.

Preferably, at least one and most preferably both of the torque receiving sections 60, 62 are located internally within the pin 26, making it extremely difficult if not impossible to develop the torque required to shear the pin by externally applied means.

The lock is also resistant to tampering and destructive disassembly by axially directed forces. More particularly, with reference to FIG. 3, externally applied axial forces at "A" and "B" will cause the pin 26 and cap 24 to "bottom out" externally at the common annular interface denoted at "X", thereby safeguarding the pin from axially induced shearing at groove 52. A similar safeguard is provided in the event that a tool is inserted into the pin to axially exert a force at "C" together with an externally applied force "A". In this case, the pin and cap will bottom out internally at the common conical interface "Y", again safeguarding the pin from axially induced shearing at groove 52.

Also, by appropriately configuring the shape and depth of the groove 52 in the shank of the pin, only a modest torque is required to effect shearing of the pin. Thus, the weight of the tool 70 can be reduced. Tool cycle time is also reduced to that required to simply close and reopen the handles 80, 84.

Various changes may be made to the embodiments herein disclosed without departing from the spirit and scope of the claimed invention. By way of example only, and without limitation, the location and configuration of the torque receiving sections and the tool dies may be varied, as can the location and orientation of the notch or other equivalent feature defining the frangible pin section. Other arrangements for permanently coupling the cap to the nose of the pin are possible, including for example mechanically interengageable surfaces integrally formed on the pin and cap.

I claim:

1. A destructible locking device comprising:
    a receiving element having an opening communicating with an interior chamber;
    a pin having a head at one end, a nose at the opposite end, and an axially extending passageway, said nose being configured and dimensioned to protrude through said opening into the interior chamber of said receiving element;
    locking means in said chamber for connecting said nose to said receiving element;
    means between said nose and said head for defining a frangible portion of said pin; and
    torque responsive means on said pin for effecting relative rotation between said nose and said head to shear said frangible portion and thereby subdivide said pin into a first segment including said nose and a second segment including said head, said torque responsive means being located at least partially within and accessible solely via said passageway.

2. The locking device as claimed in claim 1 wherein said locking means comprises an external shoulder on said nose, an internal groove in said receiving element, and a resilient split ring received in said internal groove, said split ring being configured and dimensioned to coact in snap engagement with the external shoulder on said nose.

3. The locking device as claimed in claim 2 wherein said external shoulder is located axially outboard of the means defining the frangible portion of said pin.

4. The locking device as claimed in claims 2 or 3 wherein the means for defining the frangible portion of said pin comprises a second external groove.

5. The locking device as claimed in claim 1 wherein said torque responsive means comprises first and second internally configured segments of said passageway located respectively at said nose and said head.

6. The locking device as claimed in claim 5 wherein said first and second internally configured segments have different configurations.

7. The locking device as claimed in claims 5 or 6 further comprising a tool having first and second dies, said dies being insertable into an operative position in said passageway at which said first die is engageable with the first internally configured segment of said passageway and said second die is engageable with the second internally configured segment of said passageway, and means for effecting relative rotation of said dies to generate a torque sufficient to shear said frangible portion.

8. The locking device as claimed in claim 1 wherein said receiving element is provided with a second opening communicating with said chamber, and wherein said locking means is configured to prevent extraction of said nose from said chamber via said first mentioned opening, and to accommodate extraction of said first segment from said chamber via said second opening.

9. A locking device for releasably interlocking two members having aligned openings, said apparatus comprising:

a hollow cap;

a pin extending through said openings, said pin having an enlarged head at one end, a passageway extending axially therethrough, and a nose at its opposite end received in interlocked engagement within said cap, with said members being confined between said head and said cap, said passageway having differently configured segments at said nose and said head; and means defining a frangible portion of said nose, said frangible portion being severable by a tool receivable in said passageway and engageable with said differently configured segments to effect relative rotation between said nose and said head.

10. For use with a security device having first and second mating components provided respectively with first and second openings extending between inner and outer surfaces thereof, a destructible locking device for releasably interconnecting said members in a confronting relationship in which said openings are aligned, with said inner surfaces facing towards each other and with said outer surfaces facing away from each other, said device comprising:

a hollow cap engageable with the outer surface of said first member, said cap having a mouth aligned with said first opening and leading to the interior of said cap;

a pin having a head at one end, a nose at the opposite end, and a passageway extending axially therethrough, said pin being configured and dimensioned to extend through said first and second openings, with said head in engagement with the outer surface of said second member, and with said nose protruding through said mouth into said cap;

locking means coacting with the interior of said cap and said nose for permanently connecting said pin to said cap;

means defining a frangible portion of said pin; and torque responsive means at least partially accessible via said passageway for effecting relative rotation between said nose and said head to shear said frangible portion and thereby subdivide said pin into a first segment including said nose which is separable with said cap from said first member, and a second segment including said head which is separable from said second member.

11. The locking device as claimed in claim 11 wherein said cap includes a cylindrical sleeve projecting from said mouth through said first opening, an exterior circular groove on said sleeve, and a resilient O-ring received in said groove, said O-ring serving to releasably maintain said cap in engagement with said first member.

12. The locking device as claimed in claims 1 or 11 wherein said torque responsive means comprises at least two differently configured sections of said pin.

13. The locking device as claimed in claim 13 further comprising a torque generating tool having relatively rotatable components specially configured to mate in coactive interengagement with the differently configured sections of said pin.

* * * * *